United States Patent [19]
Le Van

[11] Patent Number: 6,035,734
[45] Date of Patent: Mar. 14, 2000

[54] CONTROL SYSTEM IMPOSING AUTOMATIC MODE ABSENT DRIVER MANUAL SHIFT REQUEST

[75] Inventor: Adriana Le Van, Levallois-Perret, France

[73] Assignee: Magneti Marelli France, Nanterre, France

[21] Appl. No.: 08/930,645

[22] PCT Filed: Apr. 3, 1996

[86] PCT No.: PCT/FR96/00503

§ 371 Date: Oct. 2, 1997

§ 102(e) Date: Oct. 2, 1997

[87] PCT Pub. No.: WO96/31359

PCT Pub. Date: Oct. 10, 1996

[30] Foreign Application Priority Data

Apr. 3, 1995 [FR] France .................................. 95/03886

[51] Int. Cl.[7] .................................................. B60K 41/28
[52] U.S. Cl. ................. 74/335; 477/86; 477/174
[58] Field of Search ................... 74/335, 336; 477/166, 477/169, 174, 175, 86

[56] References Cited

U.S. PATENT DOCUMENTS

| | | | |
|---|---|---|---|
| 4,638,898 | 1/1987 | Braun | 477/86 |
| 4,971,183 | 11/1990 | Tellert | 477/86 |

*Primary Examiner*—Khoi Q. Ta
*Attorney, Agent, or Firm*—McCormick, Paulding & Huber LLP

[57] ABSTRACT

The present invention relates to a semi-automatic gearbox system, characterized by the fact that it includes control means suitable for controlling an automatic or semi-automatic operating mode for changing gear ratios in the gearbox. When actuated by the driver, the gear lever transmits the driver's request to the computer, via the sensors. After analyzing the legitimacy of the driver's request, the module proceeds to change the gear as requested. The module controls the electrically driven valves for controlling the clutch, and gear selection and engagement, and establishes dialog with the engine control computer for appropriately managing the engine torque and the engine speed during the gear change. The commands are confirmed by the position sensors on the actuators, and by the sensors for sensing the engine speed, and the inlet speed and the outlet speed of the gearbox. The absolute gear ratio engaged in the gearbox is displayed on the display.

27 Claims, 4 Drawing Sheets

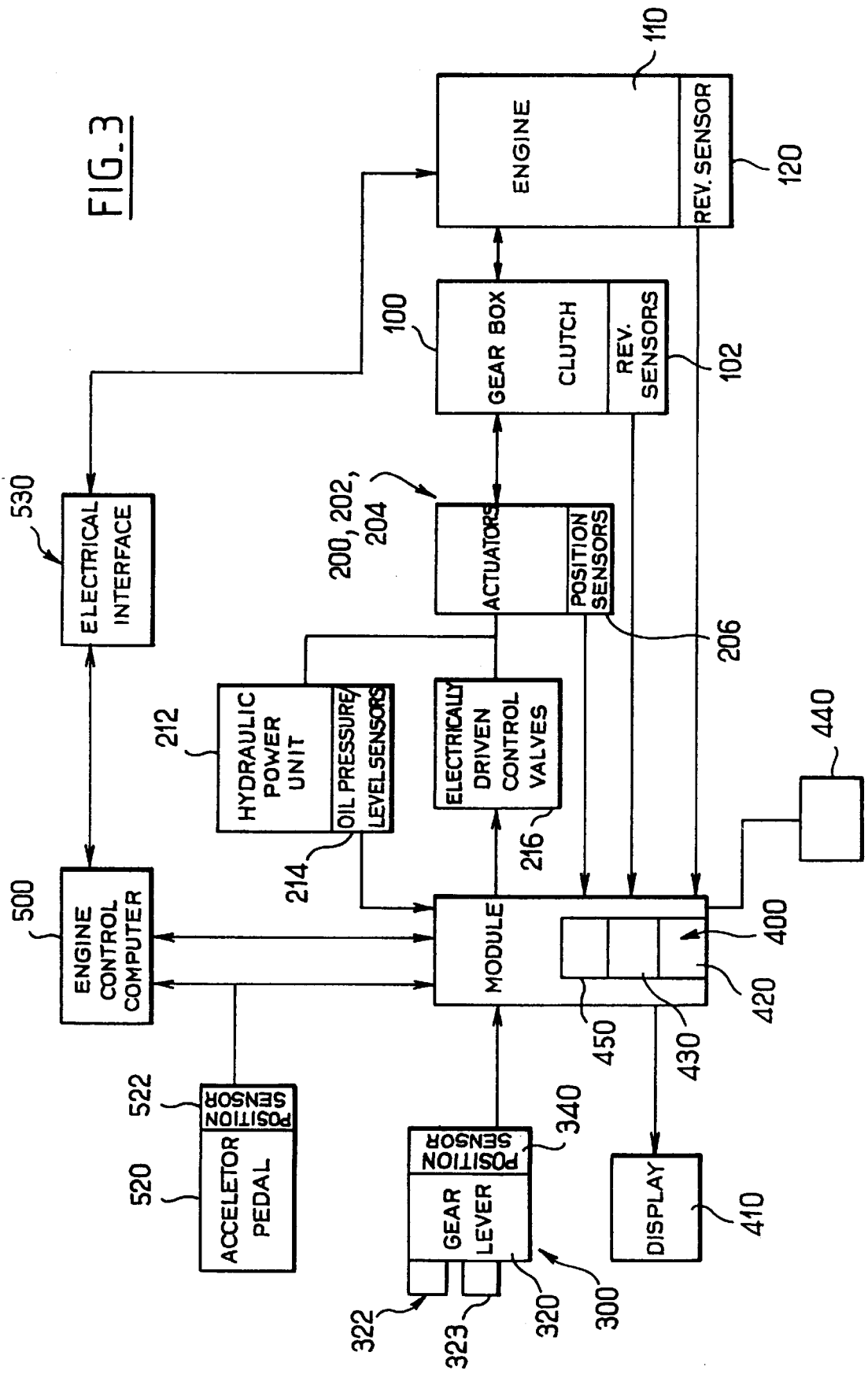

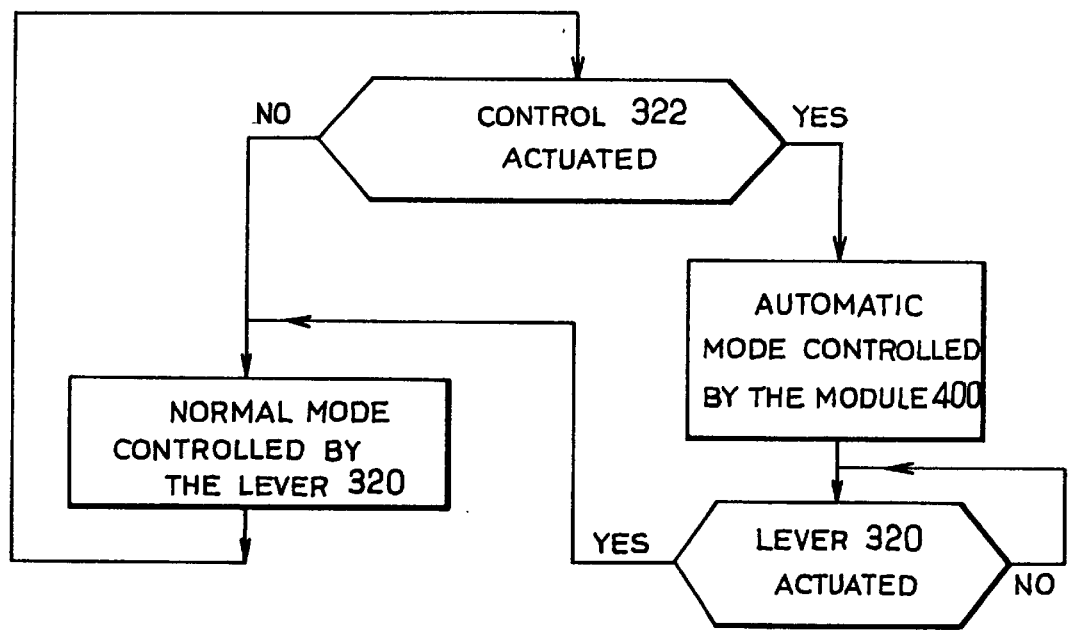
FIG_4
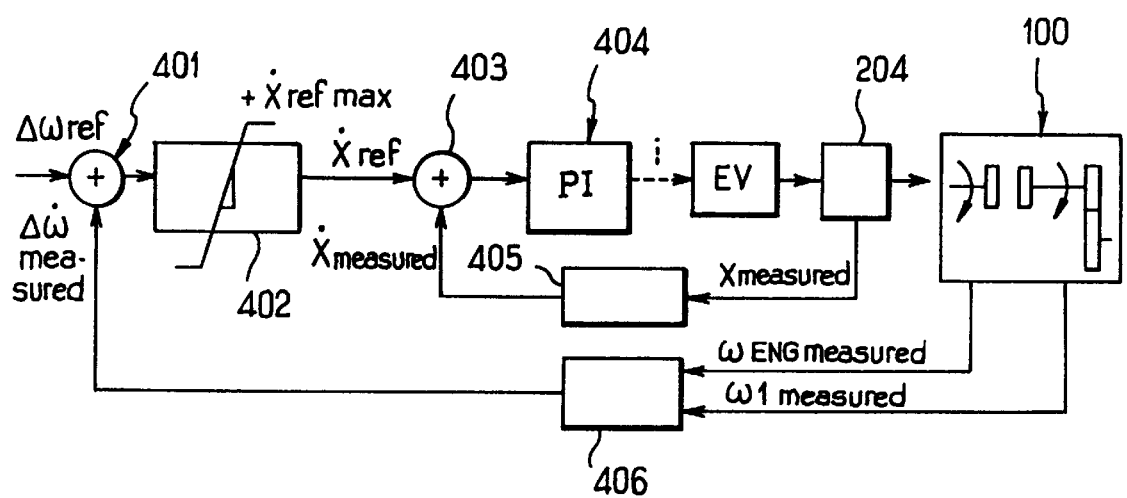
FIG_6

CONTROL SYSTEM IMPOSING AUTOMATIC MODE ABSENT DRIVER MANUAL SHIFT REQUEST

The present invention relates to gearboxes for motor vehicles.

It is known that some of the vehicles on the market today are equipped with "manual" gearboxes, and others are equipped with "automatic" gearboxes.

In a manual gearbox, the gear ratio engaged is chosen unambiguously by the driver, by means of a suitable lever, and the gears are selected or changed mechanically and directly by the lever.

Conversely, in an automatic gearbox, the driver has access, via a lever, only to a choice of a forward drive mode (low gear or high gear), a reverse drive mode, or a disengaged or neutral position (also referred to as "park"). On this basis, a module automatically moves the gearbox through both directions in which the gear ratios change, i.e. going both up through the gear ratios and down through them, without the driver being able to impose a precise choice of gear.

Automatic gearboxes are quite well accepted by certain drivers. However, they are not universally liked. In particular, they are not very well accepted in Latin countries.

In recent years, some companies have proposed vehicles equipped with "semi-automatic" gearboxes.

Accompanying FIG. 1 is a diagram showing the overall structure of such a conventional semi-automatic gearbox system.

Such a system includes a conventional gearbox 10 provided with actuators 20, which are generally fluid-driven servo-controlled actuators, suitable for acting on the gearbox 10 to change gears on the basis of instructions issued by a control assembly 30. The control assembly 30 comprises a manually-actuated control lever 32 and control transducers 34 that respond to the control lever 32 being displaced by defining gear change instructions. The control assembly 30 is associated with an electronic module 40 which receives the above-mentioned change instructions generated by the control transducers 34. The electronic module 40 controls the actuators 20 associated with the gearbox 10. In addition, the electronic module 40 is generally connected to sensors, e.g. a vehicle speed sensor 50, so that the electronic module 40 controls execution by the actuators 20 of the change instructions issued by the control assembly 30 as a function of the speed of the vehicle. For this purpose, the electronic module 40 applies instructions output by the control assembly 30 to the actuators 20 only if said instructions are compatible with the operating conditions of the vehicle.

The driver thus remains in control of choosing which gear ratio is engaged, because the driver acts on the lever 32 to request a change of gear (going up through the gears or going down through them, or else a change to reverse gear). However, the electronic module 40 oversees the system as a whole, and it authorizes a gear change only if the operating conditions of the vehicle are compatible with the change.

Such semi-automatic gearbox systems offer numerous advantages over other prior systems:

they make driving more comfortable;
they make it possible to omit the clutch pedal, as with an automatic gearbox;
they make it possible to change gear without taking the foot off the accelerator, when provision is made to integrate the gearbox system into the engine control system;
they can be implemented at an intermediate cost between the cost of a manual gearbox and the cost of an automatic gearbox;
they fully maintain the pleasure of driving;
they make it possible to improve fuel consumption, power, and engine wear as compared with manual gearboxes;
they extend the life-spans of the various members;
they improve driving safety as compared with manual gearboxes; and
they are compatible with conventional manual gearboxes.

However, in spite of all those advantages, semi-automatic gearbox systems have not been as commercially successful as expected.

Document GB-A-2 119 460 describes a semi-automatic transmission control with an automatic mode.

Document EP-A-0 547 598 describes a control device for a gearbox having manual and automatic control using automatic speed-change diagrams stored in memory.

An object of the present invention is to improve semi-automatic gearbox systems.

In a first aspect, the object is achieved by the present invention by means of a semi-automatic gearbox system, characterized by the fact that it includes means suitable for controlling an automatic operating mode for changing gear ratios in the gearbox.

In a second aspect, the object is achieved by the present invention by means of a semi-automatic gearbox system, characterized by the fact that it includes means suitable for causing first gear to be engaged automatically when the system detects that the vehicle has stopped, with the engine running, and with a gear ratio other than neutral or than reverse.

In a third aspect, the object is achieved by the present invention by means of a semi-automatic gearbox system, characterized by the fact that it includes means suitable for managing and detecting a low-grip mode in which the vehicle wheels are gripping poorly, and for responding to such a detection by imposing management suitable for minimizing variations in the engine torque transmitted to the wheels.

Other characteristics, objects, and advantages of the present invention appear on reading the following detailed description with reference to the accompanying drawings which are given by way of non limiting example and in which:

FIG. 3 is a block diagram of a system of the present invention;

FIG. 4 is a flow chart showing how the present invention operates in automatic mode;

FIG. 6 is a diagram showing how the clutch is controlled.

Figure 1:
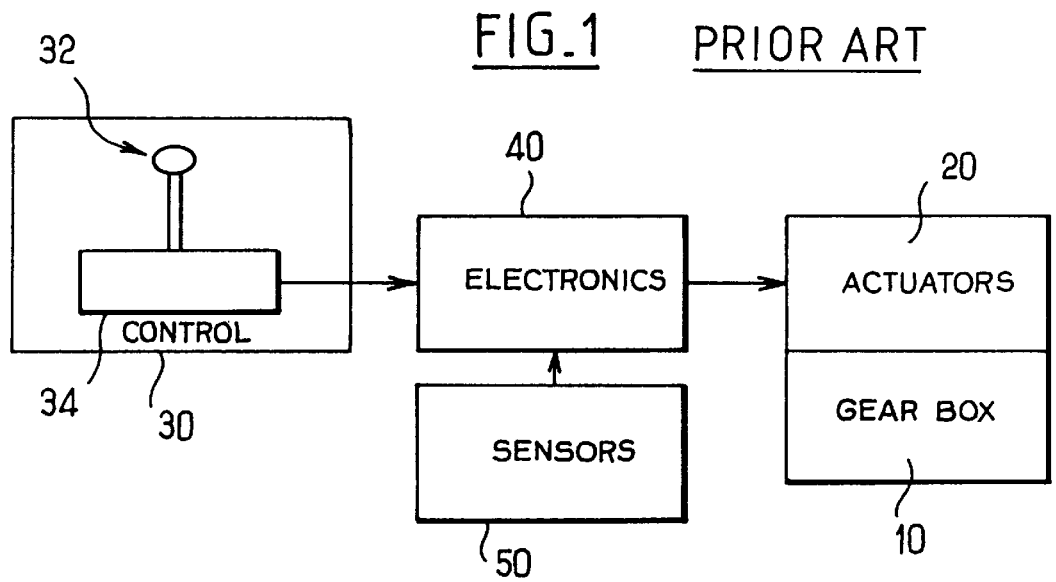
FIG. 1 (described above) is a block diagram of a prior art semi-automatic gearbox system.
Figure 2:
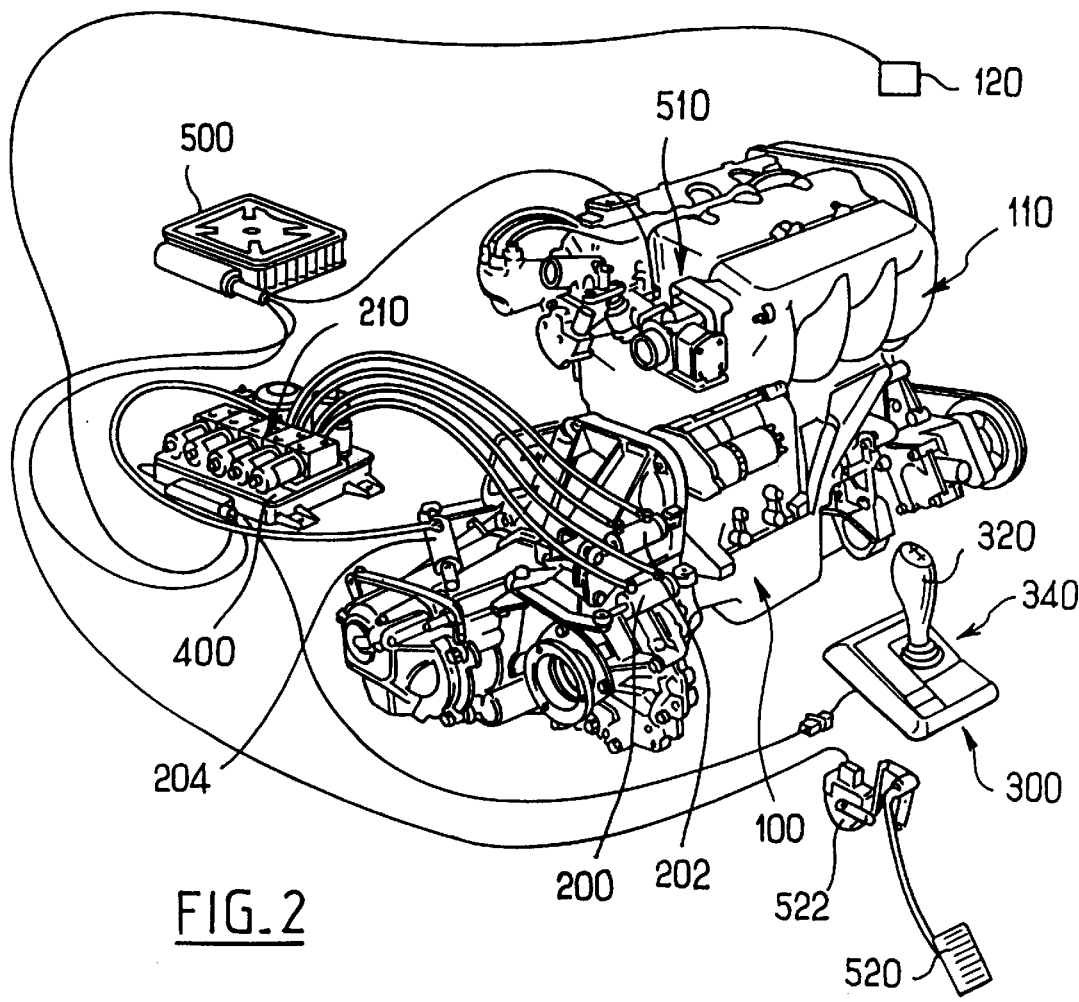
FIG. 2 is a diagrammatic view of a system of the present invention.

Accompanying FIG. 2 gives an overall view of the semi-automatic gearbox system of the present invention, which mainly comprises:

an internal combustion engine 110;
a manual gearbox 100;
two actuators 200 and 202 placed on the casing of the gearbox 100 respectively for engaging/disengaging gear ratios and for selecting gear ratios;
an additional actuator 204 associated with the clutching/declutching system so as to control it;
a control assembly 300 which comprises a manually-actuated control lever 320 and control transducers 340 that respond to the control lever 320 being displaced by defining gear change instructions; and an electronic module 400 which receives the above-mentioned change instructions generated by the control transducers 340, and which controls the actuators 200, 202, and 204 associated with the gearbox 100 and with the clutch, via a hydraulic control unit 210.

The electronic module 400 may be connected merely to a sensor 120 for sensing the revolutions of the engine of the vehicle so that the electronic module 400 controls execution by the actuators 200, 202, and 204 of the gear change instructions issued by the control assembly 300 as a function of the engine speed.

However, the electronic module 400 is preferably also connected directly to the computer 500 for managing the engine.

The module 400 can thus take advantage of the information available on the computer 500 (in particular the instantaneous engine torque, engine speed, i.e. engine revolutions, and revolutions at the outlet of the gearbox), and it can also control the computer to manage the engine torque, e.g. by acting on the air intake throttle 510 or on the injection control. In particular while changing gear, the module 400 controls the computer 500 so that it manages the engine revolutions or the torque delivered by the engine so as to avoid jolts or juddering during gear changes.

The co-operation between the module 400 and the computer 500 preferably controls each gear change in the form of a sequence of four steps as follows:

1) in a first step, the module 400 requests the computer 500 to reduce the torque delivered by the engine, and then causes declutching to take place;

2) in a second step, the module 400 disengages the previously implemented gear ratio;

3) in a third step, the module 400 causes the newly selected gear ratio to be selected, synchronized, and engaged (in gearboxes with no synchromesh, the gear ratio is engaged only once the primary shaft of the gearbox has reached the required revolutions); and 4) in a fourth step, the module 400 requests the computer 500 to re-establish engine torque and causes the clutch to be engaged.

Accompanying FIG. 3 is a block diagram showing the system in more detail.

In addition to the elements described above with reference to FIG. 2, FIG. 3 shows the following elements:

a display 410 associated with the module 400 for displaying the engaged gear to the driver;

an accelerator pedal 520 associated with a position sensor 522 connected to the module 400 and to the computer 500;

a hydraulic power unit 212 associated with oil pressure/level sensors 214 connected to the module 400, and electrically driven control valves 216 which are controlled by the module 400 and which control the actuators 200, 202, and 204;

position sensors 206 associated with the actuators 200, 204, and 206, and connected to the module 400 to monitor the real positions of the actuators;

rotation sensors 102 placed at the inlet and at the outlet of the gearbox 100, and connected to the module 400; and interface means 530 placed between the computer 500 and the engine 110 to transform the electrical output from the computer 500 into a command for setting the air intake control flap (throttle).

Overall operation of the above-described system is as follows.

When actuated by the driver, the gear lever 320 transmits the driver's request to the computer 400 via the sensors 340. After analyzing the legitimacy of the driver's request, the module 400 proceeds to change gear as requested.

The module 400 controls the electrically driven clutching, selection, and engagement control valves 216, and establishes dialog with the engine control computer 500 so as to manage the engine torque and the engine speed appropriately during the gear change.

The commands are confirmed by the position sensors 206 on the actuators 200, 202, and 204, and by the sensors 102 and 120 for sensing the engine revolutions, and the revolutions at the inlet and at the outlet of the gearbox 100.

The absolute gear ratio engaged in the gearbox 100 is displayed on the display 410.

Three important additional characteristics of the present invention are specified below.

According to a first of the additional characteristics of the invention, the module 400 is provided with means 420 suitable for controlling an automatic operating mode for changing gear in the gearbox 100. When these means 420 are activated, the gear changes are initiated and triggered by the module 400 itself, and not by the driver.

For this purpose, the means 420 preferably include a memory that stores the information required to change gear, in particular the charts of the gear changes as a function of the position of the accelerator pedal 520, of the engine speed, and of the vehicle speed.

The quality of gear changing in this automatic operating mode takes into account the fact that the system acts on a conventional manual gearbox with discrete gear ratios.

Figure 5:
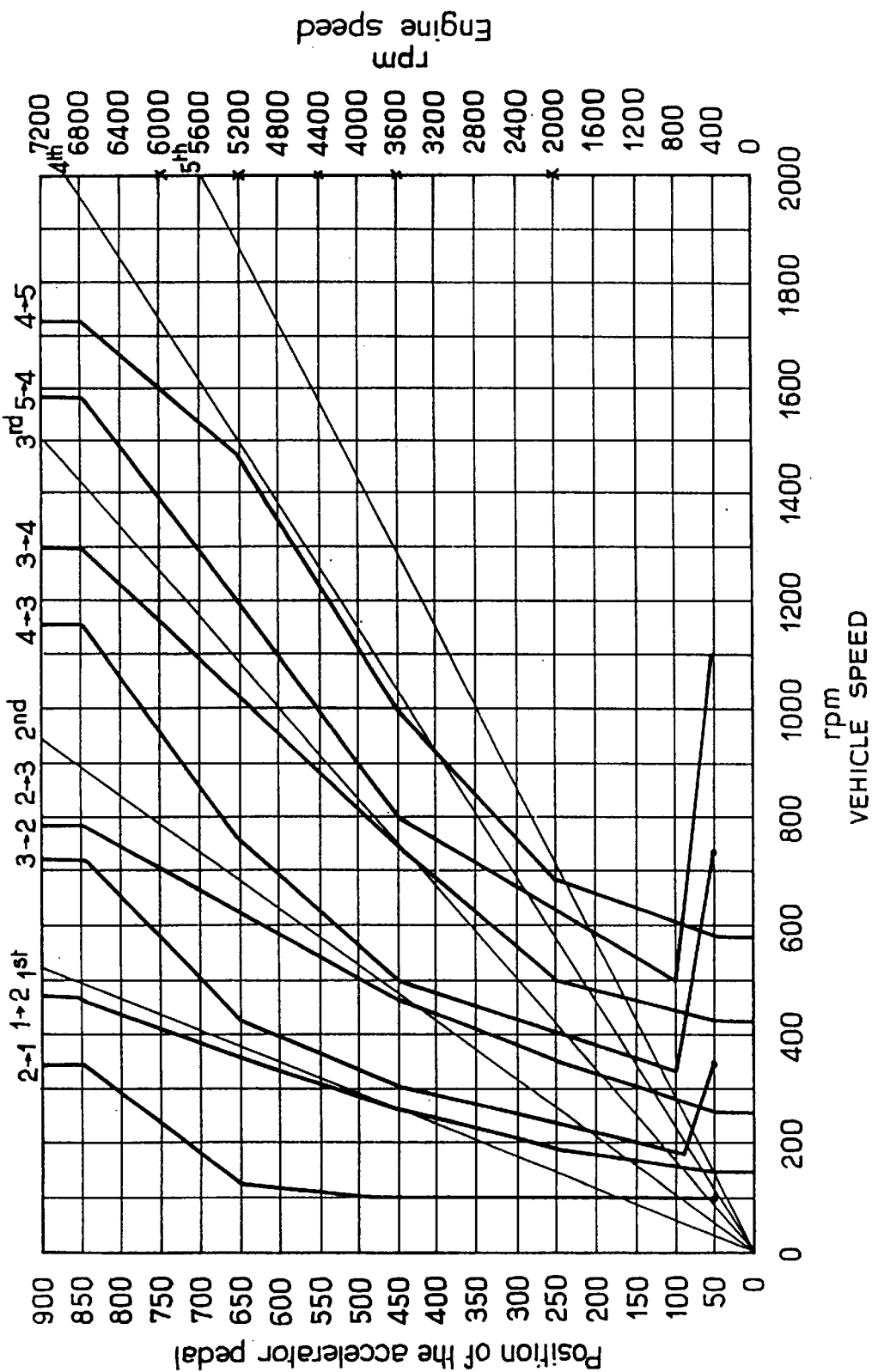
FIG. 5 is an example of a chart for automatic mode operation.

Accompanying FIG. 5 shows a non-limiting example of a chart, contained in the means 420, of gear ratio changes as a function of the position of the accelerator pedal 520, of the engine speed, and of the vehicle speed. In FIG. 5, the gear change curves are drawn in thick lines, whereas the gear ratio curves are drawn in fine lines.

When the system is placed in automatic operating mode, gears are changed automatically by using the charts shown in FIG. 5, and without the driver intervening.

They may be automatic gearbox charts which are conventional for a person skilled in the art.

The means 420 of the module 400 preferably make it possible to store three fixed families of charts corresponding to "economy", "comfort", and "sports" driving conditions, but they do not make it possible for the three families to be managed self-adaptively. The driver selects one of the three families of charts, e.g. by means of a selection button.

The numerical values given in FIG. 5 are given solely by way of example. In practice, the curves must be defined specifically for each application (type of vehicle).

More precisely, going over to automatic mode may be achieved either a) manually, by means of a control 322 available to the driver, or b) automatically.

The control 322 available to the driver is preferably formed by a monostable button placed, for example, on the lever 320. By activating this control 322, the driver can decide to go over to automatic mode.

Preferably, activating the control 322 defines a transient automatic state, i.e. the module 400 acquires automatic control of gear changing only after the control 322 has been activated. In addition, the module 400 maintains the automatic operating mode so long as the driver does not act on the gear shift control lever 320, and it cancels the automatic operating mode whenever the lever 320 is acted on.

Accompanying FIG. 4 is a flow chart corresponding to such an automatic operating mode as requested by the driver.

By examining this flow chart, it can be understood that going over from the automatic mode to the "manual" mode, i.e. to the mode in which gear changing is controlled by the lever 320, takes place only at the driver's initiative. As soon as the driver acts on the lever 320, the module 400 goes over to manual mode, causing engagement of the next gear up or the next gear down from the gear in which the gearbox 100 was engaged in automatic mode. The "neutral" or "reverse" commands also act immediately (to go over from automatic mode to normal mode), if the gear change conditions are satisfied. However, there is an exception to the above rule: when the vehicle is stationary, or while parking maneuvers are being performed from such a stationary position, the system remains in automatic mode in spite of any intervention by the driver on the lever to select a forward gear or a reverse gear.

In a variant, it is also possible to go over from automatic mode to manual mode by acting on the control 322 (e.g. a monostable button).

The advantage of using a monostable button for selecting automatic mode is that the driver does not have to perform a plurality of operations to return to manual mode.

When the driver quits automatic mode, the module 400 abandons any gear change that is being made at the time at which the lever 320 is actuated.

Preferably, on switching off, the system retains the previously existing operating mode.

Going over automatically to the automatic operating mode is decided by a subassembly of the means 420 when the module 400 no longer recognizes the requests made by the driver, as expressed by the lever 320 being actuated.

In which case, the automatic mode is preferably a degraded operating mode in which the module 400 limits the gear ratio change authorizations, e.g. by authorizing only changes up to third gear for a 5-speed gearbox. Such a degraded mode in particular prompts the driver to go to a maintenance workshop to identify and repair the causes of the failure to recognize instructions output by the transducers 340.

According to a second additional characteristic of the invention, the module 400 is provided with means 430 suitable for causing first gear to be engaged automatically when the system detects that the vehicle has come to a halt, with the engine 110 running, and with a gear ratio other than neutral or than reverse.

These means 430 make it possible in particular when the vehicle has stopped, e.g. at traffic lights, for the vehicle to start off immediately, the acceleration being determined by the accelerator pedal 520.

Preferably, the system further includes a device 440, e.g. an audible device, suitable for warning the driver of dangerous situations, e.g. of the type in which the vehicle is stationary, with the engine running, with first gear engaged, and with a door open.

The system assumes that the vehicle is stationary when the engine speed (as detected by the sensor 120) and the inlet speed and the outlet speed of the gearbox 100 (as detected by the sensors 102) are below minimum thresholds for a predefined lapse of time T.

This parameter T can be configured differently depending on whether or not the vehicle is equipped with an Anti-Blocking System (ABS).

When the vehicle is not equipped with an ABS, the time T is longer so as not to confuse a period during which the vehicle is stationary with a period during which the vehicle is skidding with its wheels blocked, e.g. on ice.

In a typical embodiment, the means 430 are suitable for causing first gear to be engaged automatically when:

the lever 320 is in the rest position; and the system is not in the automatic operating mode; and the gear ratio engaged is a gear that corresponds to a gear higher than first gear; and the engine speed is higher than a threshold, e.g. 400 revolutions per minute (r.p.m.); and the speed of the primary shaft of the gearbox 100 is lower than a threshold, e.g. 200 r.p.m.; and the speed of the differential outlet shaft is lower than a threshold, e.g. 50 r.p.m.

The means 430 cause first gear to be engaged by causing the following to occur successively:

the old gear (2nd to 5th gear) is disengaged;

the position containing first gear is selected; and first gear is engaged.

During all of these operations, the clutch remains disengaged.

According to a third additional characteristic of the invention, the module 400 is provided with means 450 suitable for detecting a low-grip mode in which the vehicle wheels are gripping poorly, and for responding to such detection by constraining the module 400 to manage gear changing in such manner as to minimize variations in the engine torque transmitted to the wheels.

Preferably, the means 450 perform this management by different parameterization for the relationships governing the following:

reducing the engine torque as requested to the computer 500 prior to the gear change;

declutching prior to the gear change;

clutching after the gear change;

re-establishing the engine torque as requested to the computer 500 after the gear change; and clutching while the vehicle is starting.

Furthermore, the means 450 are preferably suitable for automatically constraining the gearbox to change into second gear when the vehicle stops and when low-grip conditions are detected.

It should be noted that the time required for changing gear is increased with the above process. However, the time during which traction is lost during the gear change remains unchanged because this time spans only those actions (disengagement, selection, engagement) which do not influence the variations in transmitted engine torque.

The times required for reducing and re-establishing the torque and for declutching and clutching are longer than in the normal-grip mode and different (longer) when changing down than when changing up.

Going over to low-grip mode may take place a) manually, by the driver actuating a suitable control 323, or b) automatically.

The control 323 is preferably formed by a bistable button having two positions, namely a first position corresponding to a low-grip operating mode and a second position corresponding to a normal-grip operating mode.

When the means 450 detect that the control 323 has switched over to a first position, i.e. they detect the low-grip mode in which the wheels do not grip very well, they directly initiate the management suitable for minimizing the variations in the engine torque transmitted to the wheels.

The means 450 are provided with a sub-assembly suitable for detecting a "blocked wheels" situation, e.g. by examining a corresponding output on an ABS computer, and for responding to such detection by automatically switching over to low-grip mode.

Returning to normal-grip mode from low-grip mode may take place either a) manually by means of the control 323

(for this purpose, the driver acts on the button 323 to put it back in its second position), or b) automatically (in which case, the module 400 automatically puts the system back into normal mode once it no longer receives a "wheels blocked" signal).

Preferably, the clutch associated with the engine 110 is controlled in a closed loop by the module 400 using an algorithm of the proportional integral (PI) type, as shown in the control diagram given in FIG. 6.

With reference to FIG. 6:

$\Delta\omega^{\bullet}_{ref}$ is a reference to be reached equal to the differentiated difference between a reference engine speed $\omega$eng and the reference speed $\omega1$ of the primary shaft of the gearbox; the value $\Delta\omega^{\bullet}_{ref}$ corresponds to a parameter imposed on the system by the module 400 as a function of the position of the accelerator pedal and of the change in gear taking place;

$X^{\bullet}_{ref}$ is the differentiated position of the clutch actuator 204; it is a parameter imposed on the system (objective to be reached) as a function of the position of the accelerator pedal and of the change in gear taking lace;

PI is the PI-type control algorithm;

i is the current for controlling the electrically driven clutch valve;

EV is the electrically driven clutch valve;

$X_{measured}$ is the position of the clutch actuator 204 as measured by the position sensor associated therewith;

$\omega ENG_{measured}$ is the engine speed as measured;

$\omega1_{measured}$ is the primary shaft speed as measured; and $\Delta\omega^{\bullet}_{measured}$ is the differentiated difference between the engine speed as measured and the primary shaft speed as measured.

As shown in FIG. 6, the clutch servo-control loop comprises:

an adder 401 which sums the above-mentioned parameters $\alpha\nu\delta\Delta\omega^{\bullet}_{measured}$;

a calculator module 402 that integrates the signal output from the adder 401 to a limit $X^{\bullet}_{ref\,max}$, and that outputs the signal $X^{\bullet}_{ref}$;

an adder 403 which sums the signal $X^{\bullet}_{ref}$ and the signal $X^{\bullet}_{measured}$ (which is equal to the derivative of the signal $X_{measured}$ generated by the sensor associated with the clutch actuator 204);

a calculator module 404 which applies the PI-type control algorithm to the signal output by the adder 403, and which generates at its output the current i for controlling the electrically driven clutch valve;

the electrically driven valve EV controlled by the current i;

the clutch actuator 204 equipped with the position sensor delivering the signal $X_{measured}$;

a calculator module 405 which calculates the derivative $X^{\bullet}_{measured}$ of the signal generated by the sensor; and a calculator module 406 which calculates the differentiated difference $\Delta\omega^{\bullet}_{measured}$ between the engine speed as measured $\omega ENG_{measured}$ and the primary shaft speed as measured $\omega1$.

The low-grip mode is obtained by giving appropriate values to the parameters $\Delta\omega^{\bullet}_{ref}$ and $X^{\bullet}_{ref}$ so that the clutch closes more slowly and so that the variations in the engine torque transmitted to the wheels are minimized.

Naturally, the present invention is not limited to the particular embodiments described above, but rather it extends to any variant complying with the spirit of it.

I claim:

1. A control system for a semi-automatic gearbox, including a lever for controlling gear changes, control means for controlling an automatic operating mode for changing gear ratios in the gearbox, wherein the control means include a control button available to the driver on said lever for initiating an automatic operating mode, and for initiating a change over from automatic mode to manual mode, and wherein said system further includes a subassembly having means for analyzing the actuation of the lever representing the requests made by the driver and for imposing an automatic operating mode when it no longer recognizes the requests made by the driver, as expressed by actuating the lever.

2. A system according to claim 1, characterized by the fact that the control means include a memory which stores the information required to change gear ratios.

3. A system according to claim 1, characterized by the fact that the control means include a memory which stores the charts for changing gear as a function in particular of the position of the accelerator pedal of the engine speed, and of the vehicle speed.

4. A system according to claim 3, characterized by the fact that the control means store a plurality of gear change charts that can be selected by the driver.

5. A system according to claim 3, characterized by the fact that the control means store three charts corresponding respectively to "economy" driving, to "comfort" driving, and to "sports" driving, the charts being selectable by the driver.

6. A system according to claim 1, characterized by the fact the control button available to the driver is formed by a monostable button.

7. A system according to claim 1, characterized by the fact that the control button available to the driver is formed by a monostable button.

8. A system according to claims 1, characterized by the fact that the control button available to the driver defines a transient automatic state in which a control module maintains the automatic operating mode so long as the driver does not act on a gear shift control lever or on the control button itself, thereby canceling the automatic operating mode.

9. A system according to claim 1, characterized by the fact that the subassembly imposes a degraded operating mode limiting the authorizations for gear changes.

10. A system according to claim 1, characterized by the fact that it includes means suitable for causing first gear to be engaged automatically when the system detects that the vehicle has stopped, with the engine running, and with a gear ratio other than neutral or than reverse.

11. A system according to claim 1, characterized by the fact that it includes a signaling device suitable for warning the driver of dangerous situations.

12. A system according to claim 1, characterized by the fact that it includes a signaling device suitable for warning the driver of dangerous situations of the type in which the vehicle is stationary, with the engine running, with first gear engaged, and with a door of the vehicle open.

13. A system according to claim 11, characterized by the fact that the signalling device is an audible device.

14. A system according to claim 10, characterized by the fact that the vehicle is stationary when the engine speed and the inlet speed and the outlet speed of the gearbox are below minimum thresholds for a predefined time T.

15. A system according to claim 14, characterized by the fact that the predefined time T can be configured differently depending on whether or not an ABS system is present.

16. A system according to claim 1, characterized by the fact that it includes a control device suitable for causing first gear to be engaged automatically when:

a control lever is in the rest position; and the system is not in the automatic operating mode; and the gear ratio engaged is a gear that corresponds to a gear higher than first gear; and the engine speed is higher than a threshold; and the speed of the primary shaft of the gearbox is lower than a threshold; and the speed of the differential outlet shaft is lower than a threshold.

17. A system according to claim 1, characterized by the fact that clutching is controlled in a closed loop by a proportional integral type algorithm.

18. A system according to any one of claims 1, characterized by the fact that the clutch control loop comprises:

an adder which sums firstly a reference $\Delta\omega^{\cdot}_{ref}$ equal to the differentiated difference between a reference engine speed and the reference speed of the primary shaft of the gearbox;

a calculator module that integrates the signal output from the above-mentioned adder to a limit $X^{\cdot}_{ref}$ max;

an adder which sums the output of the above-mentioned calculator module and the derivative of a signal generated by a sensor associated with the clutch actuator;

a calculator module which applies a proportional integral type control algorithm to the signal output by the above-mentioned adder, and which generates at its output a current i for controlling the electrically driven clutch valve;

the electrically driven valve EV;

the clutch actuator;

a calculator module (405) which calculates the derivative of the signal generated by the sensor associated with the clutch actuator; and a calculator module which calculates the differentiated difference $\Delta\omega^{\cdot}$ between the engine speed as measured $\omega$ENG and the primary shaft speed as measured $\omega 1$.

19. A system according to claim 18, characterized by the fact that the low-grip mode is obtained by giving specific values to the input parameter $\Delta\omega'$ of the first adder and to the ouput parameter Xref of the first calculator module so as to slow the clutch close and so as to minimize variations in the engine torque transmitted to the wheels.

20. A control system for a semi-automatic gearbox, including a lever for controlling gear changes, control means for controlling an automatic operating mode for changing gear rations in the gearbox, wherein the control means include a control button available to the driver on said lever for initiating an automatic operating mode, wherein said system further includes a change over from automatic mode to manual mode, wherein said system further includes a subassembly comprising means for analyzing the actuation of the lever representing the requests made by the driver and for imposing an automatic operating mode when it no longer recognizes the requests made by the driver, as expressed by actuating the lever, and wherein said system further includes means, for maintaining the system in automatic mode, when the vehicle is stationary, or while parking maneuvers are being performed from such a stationary position, in spite of any intervention by the driver on the lever to select a forward gear or a reverse gear.

21. A control system for a semi-automatic gearbox, including a lever for controlling gear changes, control means for controlling an automatic operating mode for changing gear ratios in the gearbox, wherein the control means include a control button available to the driver on said lever for initiating an automatic operating mode, and for initiating a change over from automatic mode to manual mode, wherein said system further includes a subassembly comprising means for analyzing the actuation of the lever representing the requests made by the driver and for imposing an automatic operating mode when it no longer recognizes the requests made by the driver as expressed by actuating the lever, said subassembly further imposing a degraded operating mode limiting the authorizations for gear changes.

22. A control system for a semi-automatic gearbox, including a lever for controlling gear changes, control means for controlling an automatic operating mode for changing gear ratios in the gearbox, wherein the control means include a control button available to the driver on said lever for initiating an automatic operation mode, and for initiating a change over from automatic mode to manual mode, wherein said system further includes a subassembly comprising means for analyzing the actuation of the lever representing the requests made by the driver and for imposing an automatic operating mode when it no longer recognizes the requests made by the driver, as expressed by actuating the lever, and wherein said system further includes means for causing first gear to be engaged automatically when the system detects that the vehicle has stopped, with the engine running, and with a gear ratio other than neutral or than reverse.

23. A system according to claim 22, wherein said system detects that the vehicle has stopped when the engine speed and the inlet speed and the outlet speed of the gearbox are below minimum thresholds for a predefined time T.

24. A system according to claim 23, wherein the predefined time T can be configured differently depending on whether or not an ABS system is present.

25. A control system for a semi-automatic gearbox, including a lever for controlling gear changes, control means for controlling an automatic operating mode for changing gear ratios in the gearbox, wherein the control means include a control button available to the driver on said lever for initiating an operating mode, and for initiating a change over from automatic mode to manual mode, wherein said system further includes a subassembly comprising means for analyzing the actuation of the lever representing the requests made by the driver and for imposing an automatic operating mode when it no longer recognizes the requests made by the driver, as expressed by actuating the lever, wherein said system further includes a control device for causing first gear to be engaged automatically when:

a control lever is in the rest position; and the system is not in the automatic operating mode; and the gear ratio engaged is a gear that corresponds to a gear higher than first gear; and the engine speed is higher than a threshold; and the speed of the primary shaft of the gearbox is lower than a threshold; and the speed of the differential outlet shaft is lower than a threshold.

26. A control system for a semi-automatic gearbox, including a lever for controlling gear changes, control means for controlling an automatic operating mode for changing gear ratios in the gearbox, wherein the control means include a control button available to the driver on said lever for initiating an automatic operating mode, and for initiating a change over from automatic mode to manual mode, wherein said system further includes a subassembly comprising means for analyzing the actuation of the lever representing the requests made by the driver and for imposing an automatic operating mode when it no longer recognizes the requests made by the driver, as expressed by actuating the lever, and a clutch control loop comprising:

an adder which sums firstly a reference $\Delta\omega'$ equal to the differentiated difference between a reference engine speed and the reference speed of the primary shaft of the gearbox;

a calculator module that integrates the signal ouput from the above-mentioned adder to a limit Xref max;

an adder which sums the output of the above-mentioned calculator module and the derivative of a signal generated by a sensor associated with the clutch actuator;

a calculator module which applies a proportional integral type algorithm to the signal output by the above-mentioned adder, and which generates at its ouput a current i for controlling an electrically driven clutch valve;

the electrically driven valve EV;

a clutch actuator;

a calculator module which calculates the derivative of the signal generated by the sensor associated with the clutch actuator; and a calculator module which calculates the differentiated difference $\Delta\omega'$ between the engine speed as measured $\omega ENG$ and the primary shaft speed as measured $\omega 1$.

27. A system according to claim 26, characterized by the fact that the low-grip mode is obtained by giving suitable values to the input parameter $\Delta\omega'$ of the first adder and to the output parameter Xref of the first calculator module so as to slow the clutch close and so as to minimize variations in the engine torque transmitted to the wheels.

* * * * *